(12) United States Patent
Frydendal

(10) Patent No.: US 9,310,801 B2
(45) Date of Patent: Apr. 12, 2016

(54) DETERMINING AN EQUIVALENT MECHANICAL LOAD

(75) Inventor: Ib Frydendal, Føvling (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 927 days.

(21) Appl. No.: 13/263,893

(22) PCT Filed: Jun. 29, 2009

(86) PCT No.: PCT/EP2009/058092
§ 371 (c)(1),
(2), (4) Date: Oct. 11, 2011

(87) PCT Pub. No.: WO2010/121669
PCT Pub. Date: Oct. 28, 2010

(65) Prior Publication Data
US 2012/0035864 A1    Feb. 9, 2012

(51) Int. Cl.
| | |
|---|---|
| *G01L 1/06* | (2006.01) |
| *G01B 5/30* | (2006.01) |
| *G01L 1/10* | (2006.01) |
| *G06F 3/01* | (2006.01) |
| *G05B 23/02* | (2006.01) |

(52) U.S. Cl.
CPC .................................. *G05B 23/0221* (2013.01)

(58) Field of Classification Search
CPC ........................................................ G05B 7/02
USPC ......... 702/34, 40, 41, 42, 124, 155, 179, 182, 702/189; 318/135; 701/33.2; 703/1
See application file for complete search history.

(56) References Cited

U.S. PATENT DOCUMENTS

| | | | | |
|---|---|---|---|---|
| 4,336,595 | A * | 6/1982 | Adams et al. | 702/34 |
| 6,449,565 | B1 * | 9/2002 | Budrow et al. | 702/42 |
| 7,589,482 | B2 * | 9/2009 | Sepe, Jr. | 318/135 |
| 7,949,479 | B2 * | 5/2011 | Brown et al. | 702/34 |
| 8,600,611 | B2 * | 12/2013 | Seize | 701/33.2 |

(Continued)

FOREIGN PATENT DOCUMENTS

DE        10208144 A1    10/2002

OTHER PUBLICATIONS

Matsuiski, M. and Endo, T.; "Fatigue of metals subjected to varying stress"; Japan Soc. Mech. Engineering (1969). No document available.

(Continued)

*Primary Examiner* — Gregory J Toatley
*Assistant Examiner* — Felix Suarez

(57) ABSTRACT

A method for determining an equivalent mechanical load of a component includes a dynamic mechanical loading. A first measurement value of the mechanical load of the component is measured and compared to a first reference value. Further, at least one count value representing the number of load half-cycles of the component is updated based upon the result of comparing, wherein the load half-cycles correspond to a predetermined range of mechanical loads and occur within a time period prior to the measurement of the first measurement value. A first equivalent mechanical load of the component is determined based on the first updated count value. It is further described a program element and a computer-readable medium having stored a program for controlling the described equivalent mechanical load determining method.

17 Claims, 1 Drawing Sheet

(56) References Cited

U.S. PATENT DOCUMENTS

2006/0070435 A1    4/2006  LeMieux
2008/0275672 A1*  11/2008  Varon-Weinryb ................ 703/1

OTHER PUBLICATIONS

S.D. Downing and D.F. Socie; "Simple rainflow counting algorithms"; International Journal of Fatigue, Jan. 1982, pp. 31-40, vol. 4, Issue 1.

James W. Provan; "Fracture, Fatigue and Mechanical Reliability", Part II, Spring 2008, pp. 1-25; De[artment of Mechanical Engineering, University of Victoria, Victoria, BC, Canada.

Matsuiski, M. and Endo, T.; "Fatigue of metals subjected to varying stress"; Japan Soc. Mech. Engineering (1969), pp. 37-40.

Wikipedia, the free encyclopedia, "Rainflow-counting algorithm", Sep. 2, 2010, pp. 1-3, Provided to support NPL #1—of Matsuiski, M and Endo, T.

* cited by examiner

DETERMINING AN EQUIVALENT MECHANICAL LOAD

CROSS REFERENCE TO RELATED APPLICATIONS

This application is the US National Stage of International Application No. PCT/EP2009/058092 filed Jun. 29, 2009, and claims the benefit thereof. The International Application claims the benefits of U.S. Provisional Application No. 61/172,262 US filed Apr. 24, 2009. All of the applications are incorporated by reference herein in their entirety.

FIELD OF INVENTION

The present invention generally relates to the field of determining equivalent mechanical loads of a component. In particular the present invention relates to a method for determining an equivalent mechanical load of a component of a machine, which component is subjected to a dynamic mechanical loading. Further, the present invention relates to a program element and to a computer-readable medium having stored a computer program, which, when being executed by a data processor, are adapted for controlling the equivalent mechanical load determining method.

ART BACKGROUND

At the present rainflow-counting and its variants are the most widely used methods in the analysis of fatigue data of mechanical components. The rainflow-counting method allows assessing the fatigue life of a structure subjected to a complex dynamic mechanical loading, the assessing being based on counting numbers of load half-cycles. The rainflow-counting method was originally developed in: Matsuiski, M. and Endo, T. *Fatigue of metals subjected to varying stress, Japan Soc. Mech. Engineering* (1969). A variant of the rainflow-counting method, as described in: Downing, S. D., Socie, D. F. (1982) *Simple rainflow counting algorithms. International Journal of Fatigue*, Volume 4, Issue 1, January, 31-40, is used for the fatigue analysis of wind turbine components.

In order to apply the rainflow-counting method to the fatigue analysis of wind turbine components, measurements of component loads with a given sampling frequency are performed during the life-time of the wind turbine. Thereby, measurements of mechanical loads obtained in a response time, i.e., a predefined time period within the life-time of the turbine, for instance, a time period of 10 minutes are collected and used to obtain the time dependence of the mechanical load during the response time, the time dependence being represented by the corresponding discrete load curve, i.e. sample curve. The whole sample curve is used to determine the numbers of load half-cycles belonging to individual bins. This means that all measurements of mechanical loads performed during the response period are used. The numbers of load half-cycles belonging to individual bins occurring during the response time are then used to update count values of numbers of half-cycles belonging to individual bins occurring from a starting time of the counting. The starting time may be the time when the wind turbine has been brought into operation. Hence, the rainflow-counting method exhibits a severe drawback, which is inherent to the rainflow-counting method because when using this method, it is not possible to update the count values of numbers of half-cycles with each new sample, i.e., with each new load measurement.

It may be an object of the present invention to provide an efficient and reliable mechanical load determination for a component, in particular for a component of a machine, which component is subjected to a dynamic mechanical loading.

SUMMARY OF THE INVENTION

In order to achieve the object defined above, a method for determining an equivalent mechanical load of a component, in particular of a component of a machine, which component is subjected to a dynamic mechanical loading according to the independent claim 1 is provided.

According to a first aspect of the invention, a method for determining an equivalent mechanical load of a component, in particular of a component of a machine, which component is subjected to a dynamic mechanical loading is provided. The method comprises measuring a first measurement value of the mechanical load of the component and comparing the first measurement value with a first reference value. The method further comprises first updating at least one count value representing the number of load half-cycles of the component based on the result of comparing, wherein the load half-cycles correspond to a predetermined range of mechanical loads and occur within a time period prior to the measurement of the first measurement value. The method furthermore comprises determining a first equivalent mechanical load of the component based on the first updated count value.

This aspect of the invention is based on the idea that an effective method for determining an equivalent mechanical load may be provided, if the equivalent load for the component can be updated when a load sample data for the component, such as one measurement value of the mechanical load, is obtained. Knowledge of the updated equivalent load value may be of great importance, since fatigue may occur if the component is subjected to a dynamic mechanical loading.

The term "fatigue" may particularly denote any progressive and localized structural damage of the material of the component.

The term "mechanical load" or simply "load" may particularly denote a moment of force, the force being acting, for instance, in one spatial direction and possibly exhibiting two different orientations. Hence, the mechanical load may, for instance, denote a one-dimensional vector quantity. This means the loads may take positive as well as negative values. Hence, the terms "increasing" and "decreasing" when used in relation to the load may refer to the load understood as a one-dimensional vector, rather then to the absolute value of the load. However, the method may also apply to two- or three-dimensional mechanical loads.

The term "equivalent mechanical load" or simply "equivalent load" may in particular denote a mechanical load leading, during a given time period, to the same or equivalent fatigue of the material of the component as the actual load accumulated during the given time period.

The term "dynamic mechanical loading" or simply "dynamic loading" may particularly denote a time sequence of loads of different sizes, orientations and durations, which sequence however may exhibit identifiable time periods of increasing loads and of decreasing loads.

The term "increasing load half-cycle" or simply "increasing half-cycle" may particularly denote a mechanical loading during a period of an increasing mechanical load.

The term "decreasing load half-cycle" or simply decreasing "half-cycle" may particularly denote a mechanical loading during a period of an decreasing mechanical load.

The term "load half-cycle" or simply "half-cycle" may particularly denote a decreasing load half-cycle or an increasing load half-cycle. A load half-cycle may occur, for instance, between two adjacent local extremes of a curve representing the time dependence of the load respectively the load curve. However a load half-cycle may also occur between a starting value and a first local extreme or between a last local extreme and a last value of the load curve.

The term "load half-cycle of a predetermined range of mechanical loads" may particularly denote a half-cycle, an increasing or a decreasing one, within which half-cycle the difference between its maximal load value and its minimal load value falls in the predetermined range of mechanical load values, the load values being positive. If, for instance, the predetermined range of mechanical load values is bounded from below by a lower bound then a half-cycle may fall within the predetermined range of mechanical load values, if difference of its maximal load value and its minimal load value is greater or equal to the lower bound. In this case, similarly, a load value, such as, for instance, a difference of the first measurement value and the first reference value may fall within the predetermined range of mechanical load values if it is greater or equal to the lower bound.

Hence, according to this aspect of the invention an updating of the equivalent load is advantageously based on updating of the count value representing the number of load half-cycles of a predetermined range of mechanical loads. Such an updating may be performed each time when a measurement of the mechanical load has been performed. Hence, the method according to this invention may be advantageous because an online, i.e., based on an evaluation of each load sample data, monitoring of the component subjected to a dynamic mechanical load may be provided by the method.

According to a further embodiment of the invention, the method further comprises updating the first reference value to a second reference value based on the result of comparing the first measurement value with the first reference value. The method furthermore comprises measuring a second measurement value of the mechanical load of the component and comparing the second measurement value with the second reference value. The method also comprises second updating the at least one count value representing the number of load half-cycles of the component based on the result of comparing the second measurement value with the second reference value, wherein the load half-cycles correspond to the predetermined range of mechanical loads and occur within a time period prior to the measurement of the second measurement value. Moreover, the method comprises determining a second updated equivalent mechanical load of the component based on the second updated count value.

According to this embodiment due to the second updating of equivalent mechanical load the reliability and the effectiveness of the method may be increased. Hence, with a new load sample data the equivalent mechanical load may be immediately updated to a new value, which new value of the equivalent mechanical load may advantageously comprise information concerning the first as well as the second measurement value. As a result, the second updated count value may provide an accurate and reliable information concerning the fatigue of the material of the component at the time of the measuring the second measurement value.

The time interval between the measurements of the first measurement value and the second measurement value may depend on a sampling frequency. The sampling frequency can be advantageously chosen such that and undersampling or an oversampling may be prevented. The sampling frequency may be chosen between 0.5 Hz and 25 Hz, particularly between 5 Hz and 15 Hz and even more particularly to 10 Hz. Such sampling frequency may ensure a good accuracy of the method when the component is, for instance, a base of a wind turbine or a blade root of a wind turbine.

According to a further embodiment of the invention, first updating the at least one count value comprises increasing the at least one count value by one, if the first measurement value minus the first reference value is positive and falls within the predetermined range of mechanical loads or leaving the at least one count value unchanged, if the first measurement value minus the first reference value is positive and does not fall within the predetermined range of mechanical loads or if the first measurement value minus the first reference value is negative.

Put in other words, the at least one count value will be increased if an increasing half-cycle in the predetermined range of mechanical loads is identified, which will be the case when the first measurement value minus the first reference value is positive and big enough to fall within the predetermined range of mechanical loads. If the first measurement value minus the first reference value is positive but is too small to fall within the predetermined range of mechanical loads, no half-cycle will be identified. Further, if the first measurement value minus the first reference value is negative, also no half-cycle will be identified independently of the size of the difference. Therefore, the at least one count value will not be changed even if a decreasing half-cycle in the predetermined range of mechanical loads could possibly have been identified.

Hence, it can be said that, according to this embodiment, an increasing half-cycle in the predetermined range of mechanical loads may be identified. Accordingly, this embodiment may be referred to as being based on searching for an increasing half-cycle in the predetermined range of mechanical loads.

According to a further embodiment of the invention, in case the at least one count value has been increased by one in course of the first updating, the second updating the at least one count value comprises further increasing the at least one count value by one, if the second reference value minus the second measurement value is positive and falls within the predetermined range of mechanical loads, or leaving the at least one count value unchanged, if the second reference value minus the second measurement value is positive and does not fall within the predetermined range of mechanical loads or if the second reference value minus the second measurement value is negative. In case the at least one count value has been left unchanged in course of the first updating, the second updating the at least one count value comprises increasing the at least one count value by one, if the second measurement value minus the second reference value is positive and falls within the predetermined range of mechanical loads, or further leaving the at least one count value unchanged, if the second measurement value minus the second reference value is positive and does not fall within the predetermined range of mechanical loads or if the second measurement value minus the second reference value is negative.

Put in other words, if an increasing half-cycle has been identified based on the comparison of the first measurement value and the first reference value while searching for an increasing half-cycle in the predetermined range of mechanical loads, the at least one count value will again be increased if a decreasing half-cycle in the predetermined range of mechanical loads is identified as a next half-cycle. This will be the case when the second reference value minus the second measurement value is positive and big enough to fall within the predetermined range of mechanical loads. If the second reference value minus the second measurement value is positive but is too small to fall within the predetermined range of mechanical loads, no half-cycle will be identified. Further, if the second reference value minus the second measurement value is negative, also no half-cycle will be identified independently of the size of the difference. Therefore, the at least one count value will not be changed even if an increasing half-cycle in the predetermined range of mechanical loads could possibly have been identified.

Hence, it can be said that, according to this embodiment, a decreasing half-cycle in the predetermined range of mechanical loads may be identified, following an identification of an increasing half-cycle in the predetermined range of mechanical loads.

Also, according to this embodiment, if no increasing half-cycle has been identified based on the comparison of the first measurement value and the first reference value while searching for an increasing half-cycle in the predetermined range of mechanical loads, the search for an increasing half-cycle in the predetermined range of mechanical loads will continue. Hence, an increasing half-cycle in the predetermined range of mechanical loads may possibly be identified based on the comparison of the second measurement value and the second reference value and the at least one count value may be increased correspondingly.

Therefore, advantageously, increasing half-cycles as well as decreasing half-cycles may be identified according to this embodiment, wherein searching for a decreasing half-cycle follows after an increasing half-cycle has been identified.

According to a further embodiment of the invention, updating the first reference value to the second reference value comprises (a) setting the second reference value equal to the first measurement value, if the first measurement value minus the first reference value is positive and falls within the predetermined range of mechanical loads or if the first measurement value minus the first reference value is negative, or (b) setting the second reference value equal to the first reference value, if the first measurement value minus the first reference value is positive and does not fall within the predetermined range of mechanical loads.

Because the identification of a half-cycle may be based on the comparison of a measurement value and a corresponding reference value, an updating of the first reference value, while searching for an increasing half-cycle, may be important for a proper identification of the half-cycle.

According to this embodiment, the first reference value may be updated to the second reference value by setting the second reference equal to the first measurement value if an increasing half-cycle has been identified based on the comparison of the first measurement value and the first reference value while searching for an increasing half-cycle in the predetermined range of mechanical loads. Because the identification of the increasing half-cycle is followed by searching for a decreasing half-cycle in the same predetermined range of mechanical loads, the first measurement value can now be used as the second reference value in the subsequent searching for the decreasing half-cycle based on the comparison of the second measurement value and the second reference value.

Also, according to this embodiment, the first reference value may alternatively be updated to the second reference value by setting the second reference equal to the first measurement value if the first measurement value minus the first reference value is negative and hence the first measurement value is indicating that, while searching for an increasing half-cycle in the predetermined range of mechanical loads, the load may actually be decreasing. In this case, the first measurement value can be used as the second reference value to continue in searching for the increasing half-cycle, now however based on the comparison of the second measurement value and the second reference value.

Further, according to this embodiment, the first reference value may be updated to the second reference value by setting the second reference equal to the first reference value, i.e. the actual reference value will not be changed, if an increasing half-cycle has not been identified based on the comparison of the first measurement value and the first reference value while searching for an increasing half-cycle in the predetermined range of mechanical loads, but the load is an increasing one. In this case, the unchanged first reference value can be used as the second reference value to continue in searching for the increasing half-cycle, now however based on the comparison of the second measurement value and the second reference value.

Hence, this embodiment may be described as referring to the updating of the first reference value to the second reference in course of searching for an increasing half-cycle in the predetermined range of mechanical loads.

According to a further embodiment of the invention, first updating the at least one count value comprises (a) increasing the at least one count value by one, if the first reference value minus the first measurement value is positive and falls within the predetermined range of mechanical loads or (b) leaving the at least one count value unchanged, if the first reference value minus the first measurement value is positive and does not fall within the predetermined range of mechanical loads or if the first reference value minus the first measurement value is negative.

Put in other words, the at least one count value will be increased if a decreasing half-cycle in the predetermined range of mechanical loads is identified, which will be the case when the first reference value minus the first measurement value is positive and big enough to fall within the predetermined range of mechanical loads. If the first reference value minus the first measurement value is positive but is too small to fall within the predetermined range of mechanical loads, no half-cycle will be identified. Further, if the first reference value minus the first measurement value is negative, also no half-cycle will be identified independently of the size of the difference. Therefore, the at least one count value will not be changed even if an increasing half-cycle in the predetermined range of mechanical loads could possibly have been identified.

Hence, it can be said that, according to this embodiment, a decreasing half-cycle in the predetermined range of mechanical loads may be identified. Accordingly, this embodiment may be referred to as being based on searching for a decreasing half-cycle in the predetermined range of mechanical loads.

According to a further embodiment of the invention, in case the at least one count value has been increased by one in course of the first updating, the second updating the at least one count value comprises (a) further increasing the at least one count value by one, if the second measurement value minus the second reference value is positive and falls within the predetermined range of mechanical loads, or (b) leaving the at least one count value unchanged, if the second measurement value minus the second reference value is positive and does not fall within the predetermined range of mechanical loads or if the second measurement value minus the second reference value is negative. Alternatively, in case the at least one count value has been left unchanged in course of the first updating, the second updating the at least one count value comprises (a) increasing the at least one count value by one, if the second reference value minus the second measurement value is positive and falls within the predetermined range of mechanical loads, or (b) further leaving the at least one count value unchanged, if the second reference value minus the second measurement value is positive and does not fall within the predetermined range of mechanical loads or if the second reference value minus the second measurement value is negative.

Put in other words, if a decreasing half-cycle has been identified based on the comparison of the first measurement value and the first reference value while searching for an increasing half-cycle in the predetermined range of mechanical loads, the at least one count value will again be increased if an increasing half-cycle in the predetermined range of mechanical loads is identified as a next half-cycle. This will be the case when the second measurement value minus the second reference value is positive and big enough to fall within the predetermined range of mechanical loads. If the second measurement value minus the second reference value is positive but is too small to fall within the predetermined range of mechanical loads, no half-cycle will be identified. Further, if the second measurement value minus the second reference value is negative, also no half-cycle will be identified independently of the size of the difference. Therefore, the at least one count value will not be changed even if a decreasing half-cycle in the predetermined range of mechanical loads could possibly have been identified.

Hence, it can be said that, according to this embodiment, an increasing half-cycle in the predetermined range of mechanical loads may be identified, following an identification of a decreasing half-cycle in the predetermined range of mechanical loads.

Also, within this embodiment, if no decreasing half-cycle has been identified based on the comparison of the first measurement value and the first reference value while searching for a decreasing half-cycle in the predetermined range of mechanical loads, the search for a decreasing half-cycle in the predetermined range of mechanical loads will continue. Hence, a decreasing half-cycle in the predetermined range of mechanical loads may possibly be identified based on the comparison of the second measurement value and the second reference value and the at least one count value may be increased correspondingly.

Therefore, advantageously increasing half-cycles as well as decreasing half-cycles may be identified according to this embodiment, wherein searching for an increasing half-cycle follows after a decreasing half-cycle has been identified.

According to a further embodiment of the invention, updating the first reference value to the second reference value comprises (a) setting the second reference value equal to the first measurement value, if the first reference value minus the first measurement value is positive and falls within the predetermined range of mechanical loads or if the first reference value minus the first measurement value is negative, or (b) setting the second reference value equal to the first reference value, if the first reference value minus the first measurement value is positive and does not fall within the predetermined range of mechanical loads.

Because the identification of a half-cycle is based on the comparison of a measurement value and a corresponding reference value, an updating of the first reference value, while searching for a decreasing half-cycle, may be important for a proper identification of the half-cycle.

According to this embodiment, the first reference value may be updated to the second reference value by setting the second reference equal to the first measurement value if an decreasing half-cycle has been identified based on the comparison of the first measurement value and the first reference value while searching for a decreasing half-cycle in the predetermined range of mechanical loads. Because the identification of the decreasing half-cycle is followed by searching for an increasing half-cycle in the same predetermined range of mechanical loads, the first measurement value can now be used as the second reference value in the subsequent searching for the increasing half-cycle based on the comparison of the second measurement value and the second reference value.

Also, according to this embodiment, the first reference value may alternatively be updated to the second reference value by setting the second reference equal to the first measurement value if the first reference value minus the first measurement value is negative and hence the first measurement value is indicating that, while searching for a decreasing half-cycle in the predetermined range of mechanical loads, the load may actually be increasing. In this case, the first measurement value can be used as the second reference value to continue in searching for the decreasing half-cycle, now however based on the comparison of the second measurement value and the second reference value.

Further, according to this embodiment, the first reference value may be updated to the second reference value by setting the second reference equal to the first reference value, i.e. the actual reference value will not be changed, if a decreasing half-cycle has not been identified based on the comparison of the first measurement value and the first reference value while searching for a decreasing half-cycle in the predetermined range of mechanical loads, but the load is a decreasing one. In this case, the unchanged first reference value can be used as the second reference value to continue in searching for the decreasing half-cycle, now however based on the comparison of the second measurement value and the second reference value.

Hence, this embodiment may be described as referring to the updating of the first reference value to the second reference in course of searching for a decreasing half-cycle in the predetermined range of mechanical loads.

According to a further embodiment of the invention, at least one further count value is being associated with at least one further predetermined range of mechanical loads. The further predetermined range of mechanical loads comprises a lower bound which is higher than a lower bound of the predetermined range of mechanical loads. According to this embodiment, the method further comprises further comparing the first measurement value with a further first reference value and further first updating at least one further count value representing the number of further load half-cycles of the component based on the result of further comparing, wherein the further load half-cycles correspond to the further predetermined range of mechanical loads and occur within the time period prior to the measurement of the first measurement value. According to this embodiment, the method also comprises adapting the first updated count value. Determining the first equivalent mechanical load of the component is based on the adapted first updated count value and on the further first updated count value, according to this embodiment.

Using further count values associated with further predetermined range of mechanical loads may increase the accuracy of the method. The predetermined range of mechanical loads and the further predetermined range of mechanical loads may also comprise a common upper bound. When the component is a base or a blade root of a wind turbine the number of predetermined ranges of loads may be chosen between 50 and 350, particularly between 100 and 300, more particularly between 150 and 250. The lower bounds of the neighboring ranges of loads may be separated for instance equidistantly, for example by a value of 1 kNm. However, separation of lower bounds of the neighboring ranges need not be equidistant. The properly chosen number of predetermined ranges may also ensure an effective real time numerical determining of the equivalent load. Further, according to this embodiment an overcounting of half-cycles may be prevented. The counting of cycles may be a cumulative counting. That means, that one half-cycle may be counted more times as a half-cycle corresponding to different ranges of loads. The overcounting caused by the cumulative character of the counting may be prevented by the adapting the first updated count value.

According to a further embodiment of the invention, the adapting comprises decreasing the first updated count value by one, if the further first updating comprises increasing the at least one further count value and leaving the first updated count value unchanged, if the further first updating comprises leaving the at least one further count value unchanged.

According to this embodiment, an overcounting of half-cycles may be prevented effectively. Since the counting of cycles may be a cumulative counting, an effective preventing of the overcounting may be advantageous to ensure the accurateness of the method. Hence, if one half-cycle has been be counted more times as a half-cycle corresponding to different ranges of loads, it will be counted only once as corresponding to the range of loads with the highest lower bound between the different ranges of loads, to which ranges of loads the half-cycle has been associated.

According to a further embodiment of the invention, the method further comprises updating the further first reference value to a further second reference value based on the result of further comparing the first measurement value with the further first reference value. The described method also comprises further comparing the second measurement value with the further second reference value and further second updating the at least one further count value representing the number of further load half-cycles of the component based on the result of comparing the second measurement value with the further second reference value, wherein the further load half-cycles correspond to the further predetermined range of mechanical loads and occur within a time period prior to the measurement of the second measurement value. The described method furthermore comprises adapting the second updated count value. Determining the second updated equivalent mechanical load of the component is based on the adapted second updated count value and the further second updated count value, according to this embodiment.

According to this embodiment, the accuracy and the effectiveness of the method may be increased, due to a proper combination of choices of the number of ranges of loads and the sampling frequency. The number of predetermined ranges of loads may be chosen between 50 and 350, particularly between 100 and 300, more particularly between 150 and 250 with lower bounds of the neighboring ranges of loads separated equidistantly, for instance, by a value of 1 kNm may be advantageously combined with sampling frequency chosen between 0.5 Hz and 25 Hz, particularly between 5 Hz and 15 Hz, more particularly to 10 Hz. These choices of the number of predetermined ranges and sampling frequency may also ensure an effective and stable real time numerical determining of the equivalent load.

According to a further embodiment of the invention, adapting the second updated count value comprises decreasing the second updated count value by one, if the further second updating comprises increasing the at least one further count value and leaving the second updated count value unchanged, if the further second updating comprises leaving the at least one further count value unchanged.

According to this embodiment an overcounting of half-cycles may be prevented effectively, when the number of ranges of loads is higher than 1. Since the counting of cycles may be a cumulative counting, preventing of an overcounting becomes more important, when the number of ranges of loads and/or the sampling frequency becomes higher. This may concern the numerical accuracy, effectiveness and/or stability of the method. Hence, if one half-cycle has been be counted more times as a half-cycle corresponding to different ranges of loads, it will be counted only once as corresponding to the range of loads with the highest lower bound between the different ranges of loads, to which ranges of loads the half-cycle has been associated.

According to a further embodiment of the invention the method further comprises triggering a signal indicating the first updated equivalent load and/or the second updated equivalent load exceeding a preset threshold value.

With the signal triggering an effective protection of the component and of the whole machine may be achieved. Exceeding of the threshold value may indicate that an over-critical fatigue of the material of the component may have been reached, and hence the structural changes and/or damages of the material of the component do not allow a safe and a reliable operation of the component and/or the machine anymore. Alternatively, the triggering of the signal may be based on a determination of a fatigue life consumption or a fatigue life consumption rate, which may be determined based on the determined equivalent mechanical load. In this case the signal may indicate that the fatigue life consumption or the fatigue life consumption exceeded a respective preset threshold value. In each case, based on the signal, the component may be exchanged and a further safe and reliable operation of the machine can be ensured.

According to a further aspect of the invention, a program element for determining an equivalent mechanical load of a component is provided. The program element, when being executed by a data processor, is adapted for implementing the above described equivalent mechanical load determination method.

The computer program element may be implemented as computer readable instruction code in any suitable programming language such as, for example, JAVA, C++, and may be stored on a computer-readable medium (removable disk, volatile or non-volatile memory, embedded memory/processor, etc.). The instruction code is operable to program a computer or other programmable device to carry out the intended functions. The computer program element may be stored on a computer-readable medium such as for example a removable disk, a volatile or non-volatile memory, or an embedded memory/processor. The computer program element may also be available from a network, such as the WorldWideWeb, from which it may be downloaded.

According to a further aspect of the invention, a computer-readable medium on which there is stored a computer program for determining an equivalent mechanical load of a component is provided. The computer program, when being executed by a data processor, is adapted for implementing the method as set forth in any one of the preceding claims.

The invention may be realized by means of a computer program element respectively software. However, the invention may also be realized by means of one or more specific electronic circuits respectively hardware. Furthermore, the invention may also be realized in a hybrid form, i.e. in a combination of software modules and hardware modules.

It has to be noted that embodiments of the invention have been described with reference to different subject matters. In particular, one embodiment has been described with reference to an apparatus type claim whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claim and features of the method type claims is considered as to be disclosed with this application.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
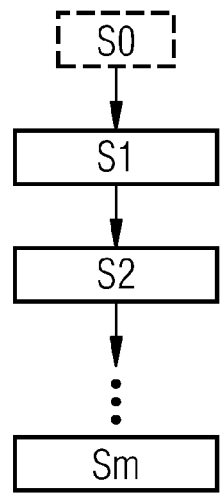
FIG. 1 illustrates a method for determining an equivalent load according to an exemplary embodiment of the invention.

The illustrations in the drawings are schematical.

FIG. 1 illustrates a method for determining an equivalent mechanical load according to an exemplary embodiment of the invention. The method concerns the determination of an equivalent mechanical load of a component, in particular of a component of a machine, the component being subjected to a dynamic mechanical loading. The machine can be, for instance, a wind turbine. The component can be, for instance a base of the wind turbine or a blade of the wind turbine, particularly a blade root of the wind turbine. In case of wind turbine components such as the base or the blade root, the mechanical load may be, for instance, the load along the direction of the wind. The method comprises counting the number of load half-cycles of the component. The load half-cycles may belong to one or more predetermined ranges of loads and may occur during an explicitly or implicitly pre-defined time interval. The time interval may be for instance the time interval starting at a time instant when the wind turbine and/or the corresponding wind turbine component has been brought into operation. For instance, the wind turbine and/or the corresponding wind turbine component has been for the first time exposed to a dynamic mechanical loading. The time period may end, for instance, at a time instant when a predetermined or estimated lifetime of the component or its fraction expires. The time period may also be not determined in advance, but may be chosen based on the determined equivalent load. For instance, the time period may end when a threshold value such as a critical value of the equivalent load is reached or exceeded.

The counting the number of load half-cycles and/or the corresponding determining of the equivalent load may be performed online. This means that the respective values can be updated each time when a new sample data are available. An individual sample datum may correspond to a load value established in one measurement of the mechanical load. Hence, the sample data may be evaluated online for each new sample data during a given time interval of length T starting at an arbitrary but fixed time instant $t=t_0$ and ending at the time instant $t_0+T$. The time interval may be given by the lifetime of the component, for instance, approximately 20 years for the wind turbine base or the wind turbine blade root, etc.

Hence, counting the number of load half-cycles may also be referred to as an online half-cycle method or algorithm. In general the steps of the method may be described independently on a sampling frequency, i.e. on a number of measurements of loads within the given time interval of length T, once the sampling frequency has been chosen. The sampling frequency may be chosen depending on the concrete application, for instance, in a range between 0.5 Hz and 25 Hz, particularly between 5 Hz and 15 Hz, more particularly it can be chosen to be 10 Hz. The sampling frequency may be chosen such that an undersampling or an oversampling may be avoided.

In a step S0, a fixed number n of ranges of loads is determined. Correspondingly, the same number of n bins and their sizes are determined. An expected or estimated range of the data signal r is calculated as the difference $r=L_{max}-L_{min}$ between an expected or estimated maximal load $L_{max}$ value and an expected or estimated minimal load value $L_{min}$ within the time interval of length T. For example, the expected and/or estimated maximal and minimal load values can be based on or correspond to known critical load values for the component. For instance, the maximal load value $L_{max}$ may be chosen as a critical load value of the material of the component in a defined direction, i.e. an extreme load value causing a fatigue of the material of the component such that the further use of the component is not possible and the component has to be exchanged. In the technical field of wind turbines maximal load value $L_{max}$ may be chosen as the extreme load value of the component or the highest load allowed for normal operation. A monitoring system may be set up to issue an error message if the maximal load value $L_{max}$ will be exceeded, in which case the wind turbine may be stopped.

Similarly the minimal load value $L_{min}$ may be chosen as the critical load value of the material of the component in the opposite direction. For instance, $L_{min}$ may be related to $L_{max}$, if the component exhibits a particular symmetry. In particular, the absolute value of $L_{max}$ may be equal to the absolute value of $-L_{min}$. In case of a wind turbine component, $L_{max}$ and $L_{min}$ may also be estimated based on estimated wind strengths in the defined direction. Based on the expected or estimated range of the data signal, the number of bins n is chosen such that an in advance fixed size of bins $L_0$ is matched. Alternatively, based on the expected and/or estimated range of the data signal, the size of bins $L_0$ is chosen such that an in advance fixed number of bins n is matched. Thereby, the size of the bins $L_0$ will be less or equal than the ratio r/n.

Hence, the bins are all of size $L_0$ are numbered by integers 0, 1, 2, ..., n−1, the $i^{th}$ bin being defined by an interval of loads $[iL_0;(i+1)L_0]$. Correspondingly, n ranges of loads are numbered by integers 0, 1, 2, ..., n−1, the $i^{th}$ range of loads being $[iL_0;r]$. Although, for simplicity, these definitions will be used to illustrate this exemplary embodiment of the invention, alternative definition may be used as well. For instance, the $i^{th}$ range of loads may also be defined as being $[(i+a)L_0;r]$ with a being from the interval $[0,1)$, in particular $[(i+\frac{1}{2})L_0;r]$. Also, the bins need not necessarily to be chosen of the same size and correspondingly the lower bounds of the ranges of loads need no be spaced equidistantly.

The number of bins can be, depending on application, between 50 and 350, particularly between 100 and 350, more particularly between 150 and 250. However, the number of bins, their sizes and the corresponding ranges of loads need not to be determined or estimated, they all may be known in advance, e.g. from any previous load determining and/or monitoring of the same or similar mechanical components, in which case the step S0 may be skipped. Hence, the step S0 is optional.

Next, the search for half-cycles corresponding to ranges of loads 0, 1, 2, ..., n−1 is performed. The search for half-cycles corresponding to individual ranges of loads is performed independently and simultaneously. For simplicity, in the sequel the search will be described for one fixed but arbitrary range of loads i. This search is performed independently and simultaneously in two directions a positive one and a negative one.

The search in the positive direction is described first in detail. The search in the positive direction starts by searching for a first increasing half-cycle corresponding to the range of loads i. As a starting reference value the load value L(0) at the time $t=t_0$ is chosen. According to the embodiment described here this starting reference value is common for all ranges of loads. The count value representing the number of load half-cycles of the component corresponding to the range of loads i is set to 0. Collection of all sample data, i.e., of all load measurements within the time interval of length T will define an a priori not known sample curve, i.e., a load curve representing the time dependency of the load, the sample data representing points of the sample curve.

In a first step S1 a first measurement value is obtained and compared to the starting condition, i.e., a first reference value L(0). Based on the comparison the count value 0 is updated. Depending on the comparison result the updated count value may remain to be unchanged, i.e., 0 or may be increased by 1, i.e., to take value 1.

In a second step S2, based on the comparison, the reference value is updated. Depending on the comparison result the updated reference value, i.e., the second reference value may be equal to the first reference value L(0) or set to be equal to the first measurement value. Next, in the same step S2 a second measured value is obtained and compared to the second reference value. Based on the second comparison the count value is updated. Depending on the comparison result the updated count value may remain to be unchanged or increased by one.

Further steps S3, S4, ..., Sm are performed in a complete analogy with the step S2. The number of steps m equals to the number of sample data, i.e., the number of load measurements in the given time interval of length T.

As already mentioned, at each of the step S1, S3, ..., Sm, the count values representing the number of load half-cycles corresponding to all predetermined ranges of loads 1, 2, ..., n may be updated. In case when the number n of the predetermined ranges of loads is higher than 1, if a half-cycle corresponding to the range of loads numbered by i, for i being greater than 1, is identified, the same half-cycle may be identified at the same step or may have been identified at one of earlier steps as a half-cycle corresponding to a range of loads numbered by any of numbers lesser than i. Therefore, at each of the steps S1, S3, ..., Sm, if the count value corresponding to the range of loads numbered by i, for i being greater than 1, is increased by 1, in addition each of the count values corresponding to ranges of loads numbered by 0, 1, 2, ..., i−1 will be decreased by 1 in order to prevent an overcounting of half-cycles. The adapted count values obtained that way may be interpreted as representing numbers of half-cycles belonging to individual bins and may be used in order to determine the equivalent loads at each of the steps S1, S3, ..., Sm.

In the steps S1, S2, ..., Sm, the following recursive rules are applied for updating the count value corresponding to the predetermined range of loads and the reference value.

Following online the sample data, i.e., moving, with each new measurement value obtained, step by step, along the a priori unknown load curve from the time $t=t_0$ and the starting reference value L(0), i.e. from a starting reference point $(t_0; L(0))$, a new reference value L(1) will be chosen, i.e., the reference value will be updated to L(1) not equal to L(0), in two cases, whichever case occurs first:

a1) one arrives at a point $(t_1;L(1))$ on the load curve in which the measurement value L(1) is lesser than the reference value L(0), or b1) one arrives at a point $(t_1;L(1))$ on the load curve in which the measurement value L(1) is greater than the reference value L(0) with the difference L(1)−L(0) greater or equal to $iL_0$, the lower bound of the range of loads i.

In the case a1) one continues in the subsequent step in searching for the first increasing half-cycle corresponding to the range of loads i, however using the new lesser reference value L(1).

In the case b1) one not only updates the reference value to a greater value L(1) but one also counts one half-cycle, in this case the first half-cycle, corresponding to the range of loads i. Also, since this half-cycle has obviously been also counted as one of half-cycles corresponding to ranges of loads 0, 1, ..., i−1, one reduces the number of counts of all half-cycles corresponding to the ranges of loads 0, 1, ..., i−1 by one in order to prevent an over-counting of half-cycles. From this point, in the subsequent step or steps, one continues the search in the positive direction by searching for a first decreasing half-cycle corresponding to the range of loads i, i.e. a second half-cycle corresponding to the range of loads i, using the greater value L(1) as the new reference value.

While searching for the first decreasing half-cycle corresponding to the range of loads i in the positive direction in the subsequent step or steps, moving along the sample curve from the time $t_1$ and the updated reference value L(1), i.e. from the reference point $(t_1;L(1))$, a new reference value L(2) will be chosen, i.e., the reference value will be updated to L(2) not equal to L(1), again in two cases, whichever case occurs first:

a2) one arrives at a point $(t_2;L(2))$ on the load curve in which the measurement value L(2) is greater than the reference value L(1), or b2) one arrives at a point $(t_2;L(2))$ on the load curve in which the measurement value L(2) is smaller than the reference value L(1) but with the difference L(1)−L(2) equal or greater to the range of loads $iL_0$, the lower bound of the range of loads i.

In the case a2) one continues in the subsequent step in searching for the first decreasing half-cycle of range i, however using the new reference value L(2).

In the case b2) one not only updates the reference value to L(2) but one also counts one half-cycle, in this case the second half-cycle, of range i. Also, since this half-cycle has obviously been also counted as one of half-cycles corresponding to ranges of loads 0, 1, ..., i−1, one reduces the number of counts of all half-cycles corresponding to the ranges of loads 0, 1, ..., i−1 by one in order to prevent an over-counting of half-cycles. From this point, in the subsequent step or steps, one continues the search in the positive direction by searching for a second increasing half-cycle corresponding to range of loads i, i.e. a third half-cycle corresponding to range of loads i, using the lesser value L(2) as the new reference value. According to the embodiment described here this search is completely analogous to the searching for the first increasing half-cycle corresponding to range of loads i and is followed by searching for a second decreasing half-cycle of range i, i.e. the fourth half-cycle corresponding to range of loads i in a complete analogy with the searching for the first decreasing half-cycle of range i. The process continues until the last point of the load curve at the time instant $t_0+T$ is reached.

According to the embodiment described here the independent and simultaneous search in the negative direction is analogous to the search in the positive direction. The only difference is that now a search for a first decreasing half-cycle, instead of the first increasing half-cycle, corresponding to range of loads i is performed starting from the starting reference value L(0). After the first decreasing half-cycle corresponding to range of loads i has been identified, a search for the first increasing half-cycle, instead of the first decreasing half cycle, corresponding to the range of loads i is performed and so forth.

At each of the steps S1, S3, . . . , Sm, one value of the equivalent load is determined for the positive search and the second value of the equivalent load is determined for the negative search. The equivalent load at each of the steps is determined to be the greater one of these to values.

Although, the method for determining an equivalent mechanical load of a component was illustrated in relation to an online evaluation of measurement values, the method can be used equally well also in the case when the load curve in the given interval is known a priori. Also, the method for determining an equivalent mechanical load of a component has been described in relation to ranges of loads. However, because of the relation between the ranges of loads and the intervals of loads corresponding to the bins, the method may unambiguously be also described and understood in relation to bins.

Further, dynamic bin administration optionally accompanying the method for determining an equivalent mechanical load according to an exemplary embodiment of the invention will be described. The dynamic bin administration may be used when an a priori estimation of the range of data signal may be problematic and there may be some possibility that the expected and/or estimated range of data signal may be exceeded by an actual range of data signal at some time instant during the load monitoring.

The dynamic bin size administration is optional and may run in parallel to and independently on the counting the number of load half-cycles, when the counting the number of load half-cycles is performed on an online sample data. The dynamic bin size administration checks, with each new measurement, the range of the data signal, i.e., the difference of the absolute maximum and the absolute minimum, within the time interval between the starting time $t_0$ and a time t when a new measurement has been performed, i.e., the time of the new sample. For simplicity, it is assumed that the number of bins n, which is an arbitrary but fixed natural number is chosen to be even. The dynamic bin size administration can be easily modified for n being odd.

If the range of the data signal in the time interval between 0 and t for a current time t exceeds the upper bound $nL_0$ of the interval of loads corresponding to the bin numbered as n−1, the following updates are carried out:

1. The size of bins $L_0$ is doubled; i.e., updated to $2L_0$. Hence, the new bin of number i, for i from 0 to n/2−1 contains now the two old bins of numbers 2i and 2i+1.
2. The lower bound of the interval of loads corresponding to the bin number i is updated to $2iL_0$.
3. The upper bound of the interval of loads corresponding to the bin number i is updated to $2(i+1)L_0$.
4. The numbers of half-cycles belonging to individual bins are updated correspondingly to point 1. The new count of half-cycles belonging to the new bin number i, for i between 0 and n/2−1, is the sum of half-cycle counts belonging to the old bins numbers 2i and 2i+1.
5. The reference value of the new bin number i, for i between 0 and n/2−1, is updated to be the reference value of the old bin of number 2i.
6. If at time t a search for an increasing/decreasing half-cycle belonging to the old bin number 2i was performed, a search for an increasing/decreasing half-cycle belonging to the new bin number i, for i between 0 and n/2−1, will be performed from the time t. However, at the time t a search for an increasing/decreasing half-cycle belonging to the old bin number 2i may have been performed while a simultaneous search for an decreasing/increasing half-cycle belonging to the old bin number 2i+1 may have been performed. Therefore, optionally, counts of half-cycles belonging to individual bins in addition to being updated according to above point 4 may also be increased by 1.
7. For new bin of numbers i, for i between n/2 and n−1:
   counts are set to zero,
   reference values are taken to be the reference value the old bin of number n and,
   at the point a search is started for an increasing half-cycle in the positive direction and for a decreasing half-cycle in the negative direction.

For simplicity, the above updates have been described in relation to the intervals of loads corresponding to bins. However, because of the relation between the ranges of loads and the intervals of loads corresponding to the bins, these updates may be unambiguously also understood in relation to the ranges of loads.

The above procedure will be repeated again when the range of the data signal within a time interval between the time instant $t_0$ and some new time instant t' will exceeded the new upper bound $n2L_0$ of the interval of loads corresponding to the new bin numbered by n−1.

Although the dynamic bin administration has been described in an example, when the size of new bins is doubled with respect to the size of old bins, any ratio greater than one of the size of new bins and the size of old bins is possible. Of course all other updates performed in course of the dynamic bin administration.

Figure 2:
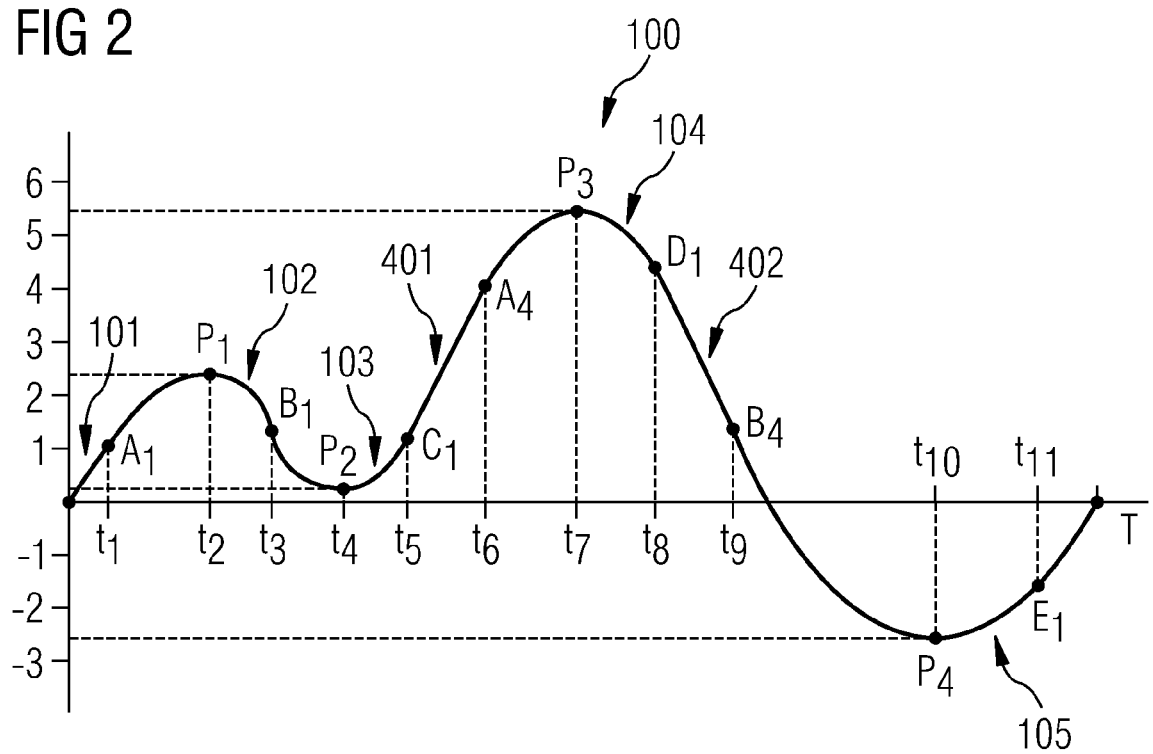
FIG. 2 illustrates a method for determining an equivalent load according to an exemplary embodiment of the invention on an example of a concrete load curve.

FIG. 2 illustrates the method for determining an equivalent load according to an exemplary embodiment of the invention on an example of a concrete load curve. The method will be described on the example of a concrete, although only illustrative, load curve 100 shown in FIG. 2. For simplicity, an idealized situation of a continuous load curve will be described, that means that the sampling rate approaches infinity and that at each time instant a new measurement value is available.

The load curve 100 represents schematically the time dependence during a time period of length T of the tower base load, i.e. moment along the wind direction. The physical unit used for the vertical axis is kNm (kNewton meters). However, the mechanical load may be also measured indirectly, in which case for example a measurement of acceleration of at least a part of the component, which is related to a force acting on it, which force is in turn related to a stress and/or a strain to which the component is subjected. Alternatively also a displacement of at least a part of the component can be performed and used as a load signal. Hence, also other physical units, for instance acceleration unit $ms^{-2}$ (meter per squared second) or displacement unit m (meter) may be used for the vertical axis as well.

For simplicity, the units of the load will not be explicitly specified in the sequel. The range of the data signal is defined by the difference between the absolute maximum at point $P_3$ and the absolute minimum at the point $P_4$ of the load curve. There are 8 ranges of loads and 8 bins. The bins are of size 1 and both ranges of loads and bins are numbered from 0 to 7. The searching for half-cycles in the positive direction will be described on examples of half-cycles corresponding to the ranges of loads 1 and 4.

Since it is assumed that there is no undersampling, at each sampling step the number of half-cycles corresponding to the ranges of loads 1 and 4 is the same as the number of half-cycles belonging to bins numbered as 1 and 4. Searching for half-cycles corresponding to ranges of loads 0, 2, 3, 5, 6 and 7, is completely analogous. The value of the load at the time t=0 is taken to be zero for simplicity. The zero value of the load defines a starting reference value and the corresponding point (0;0) of the load curve defines a starting reference point.

The search in the positive direction of half-cycles corresponding to the range of loads 1 starts at the starting reference point (0;0) searching for a first increasing half-cycle. As we move along the curve 100 starting from the reference point (0;0) we do not change the reference value as long as the load curve 100 takes values greater than the reference value 0 but lower than the load value 1. In the example of FIG. 1, the curve 100 takes values greater than 0 and lesser than 1 at each time instance in the time interval between t=0 and t=$t_1$ and reaches the load value 1 at the point $A_1$=($t_1$;1), at which point the difference between the load value at this point and the reference value 0 at t=0 is 1, corresponding to the number 1 of the range of loads. Therefore, as one is moving along the curve from the starting reference point, reference value will remain to be 0 all the way until the point $A_1$ is reached. At this point the reference value is changed to 1 and the first increasing half-cycle 101 corresponding to the range of loads 1 is identified.

At the time $t_1$ one starts to search for a first decreasing half-cycle corresponding to the range of loads 1, i.e., a second half-cycle corresponding to the range of loads 1 in positive direction. Starting from the point $A_1$ the load curve 100 is an increasing one until it reaches at the time instant $t_2$ the point $P_1$=($t_2$;2.3). Therefore, as one is now searching for a decreasing half-cycle in the positive direction, the reference value will be changed to the corresponding load value at each time instant in the interval between $t_1$ and $t_2$ as one moves along the curve 100 from the point $A_1$ until one arrives at the time $t_2$ at the point $P_1$. Hence, at the time $t_2$, the load value 2.3 is the reference value.

The point $P_1$ is a turning point of the load curve 100 and the load curve 100 starts to decrease from this point. From that point one will not change the reference value until the load value remains lower than the reference value 2.3 and remains greater than 1.3, i.e., greater than the difference between the reference value 2.3 and 1, the value 1 corresponding to the number 1 of the range of loads.

In the example of FIG. 2, the load curve 100 takes values lesser than 2.3 and greater than 1.3 at each time instant in the time interval between $t_2$ and $t_3$ and at time $t_3$ the load curve 100 reaches the point $B_1$=($t_3$;1.3). The difference between the load values at times t=$t_1$ and t=0 is 1. Therefore, the reference value 2.3 remains to be unchanged until one arrives at the point $B_1$. At this point the reference value is changed to 1.3 and the first decreasing half-cycle 102 corresponding to the range of loads 1 has is identified.

At the time $t_3$ one starts to search for a second increasing half-cycle corresponding to the range of loads 1, i.e., a third half-cycle corresponding to the range of loads 1 in the positive direction. Starting from the point $B_1$ the load curve 100 is a decreasing one until it reaches at the time instant $t_4$ point $P_2$=($t_4$;0.2). Therefore, as one is searching for an increasing half-cycle in the positive direction, the reference value will be changed at each time instant in the interval between $t_3$ and $t_4$ as one moves along the curve 100 from the point $B_1$ until one arrives at the time $t_4$ at the point $P_2$. Hence, at the time $t_4$, the load value 0.2 is the reference value.

The point $P_2$ is a turning point of the curve 100 and the curve starts to increase from this point. From that point one will not change the reference value until the load value remains greater than the reference value 0.2 and lesser than 1.2, i.e., lesser than the sum of the reference value 0.2 and 1, the value 1 corresponding to the range of loads 1.

In the example of FIG. 2, the load curve 100 takes values greater than 0.2 and smaller than 1.2 at each time instance in the time interval between $t_4$ and $t_5$ and at time $t_5$ the load curve reaches the point $C_1$=($t_5$;1.2). Therefore, the reference value 0.2 remains unchanged until one arrives at the point $C_1$. At this point the reference value is changed to 1.2 and the second increasing half-cycle 103 corresponding to the range of loads 1 is identified.

At the time $t_5$ one starts to search for a second decreasing half-cycle corresponding to the range of loads 1 in the positive direction, i.e., a fourth half-cycle corresponding to the range of loads 1 in the positive direction. The process is completely analogous to the one described above with respect to the first decreasing half-cycle 102 corresponding to the range of loads 1. The second decreasing half-cycle 104 corresponding to the range of loads 1 is identified at the point $D_1$ corresponding to the time $t_8$.

At the time $t_8$ one starts to search for a third increasing half-cycle corresponding to the range of loads 1 in the positive direction of, i.e., a fifth half-cycle corresponding to the range of loads 1 in the positive direction. The process is completely analogous to the one described above with respect to the first 101 and second increasing half-cycle 103 corresponding to the range of loads 1. The third decreasing half-cycle 105 corresponding to the range of loads 1 is identified at the point $E_1$ corresponding to the time $t_{11}$.

From the above description it is clear, that the five half-cycles 101 to 105 corresponding to range of loads 1 counted above at the points $A_1$, $B_1$, $C_1$, $D_1$ and $E_1$, respectively are all half-cycles corresponding to range of loads 1 of the sample curve 100.

Following the same method as above for half-cycles corresponding to the range of loads 4 in the positive direction one ends up with one increasing half-cycle 401 corresponding to the range of loads 4 at the point $A_4$ and one decreasing half-cycle 402 corresponding to the range of loads 4 at the point $B_4$, i.e., one ends up with two half-cycles corresponding to the range of loads 4 in the positive direction. However, one should notice that one has an over-count of half-cycles. It is clear that the half-cycle 401 corresponding to the range of loads 4 identified at the point $A_4$ has also been identified at the point $C_1$ as a half-cycle corresponding to the range of loads 1.

Similarly the half-cycle 402 corresponding to the range of loads 4 identified at the point $B_4$ has also been identified at the point D. This means that the counts produced by the method are accumulated counts. Therefore, if a half-cycle which does not correspond to the range of loads 1 is identified in the positive or in the negative direction the count value of all half-cycles corresponding to the ranges of loads numbered by smaller numbers counted in the respective direction is lowered by one.

In the example of curve 100 also the importance of both directions, the positive and the negative one, can be illustrated. If the search had been performed only in the positive direction a half-cycle corresponding to the range of loads 7, between points $P_3$ and $P_7$ would not have been identified.

If $n_i$ is the determined number half-cycles belonging to the bin number I and $L_i$ is the load characterizing the bin i, for instance, the lower bound of the interval of loads corresponding to the bin i, which is the same as the lower bound of the range of loads i then the equivalent mechanical load may be computed using the formula $$L_{eqv}=(\Sigma_i n_i (L_i)^m)^{1/m}$$

where m is the Wohler slope and the sum is taken over all bins, i.e., all ranges of loads. The Wohler slope depends on the component and it may be chosen, for instance, to be 3.5 in case of the base of the wind turbine and 15 in case of the blade root of the turbine. However, depending on a concrete application, the Wohler slope can be chosen also differently. In applications the equivalent mechanical load $L_{egv}$ may also be calculated based on full cycles instead of half-cycles, in which case the sum in the above formula has to be divided by 2.

The method for determining an equivalent mechanical load of a component can also be used for an online monitoring of gearbox pitting and rupture fatigue loads. In this case the determination of the equivalent mechanical load may be based on duration counts of tooth engagements. The method can also be easily modified for monitoring of pitch bearing activity, in which case counting of cycles corresponding to predetermined ranges of angles travelled and/or loads will be performed. Hence, measuring of angles and/or measuring of loads maybe performed in course of the monitoring of pitch bearing activity.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

LIST OF REFERENCE SIGNS 100 load curve
101 first increasing half-cycle corresponding to the range of loads 1 in the positive direction
102 first decreasing half-cycle corresponding to the range of loads 1 in the positive direction
103 second increasing half-cycle corresponding to the range of loads 1 in the positive direction
104 second decreasing half-cycle corresponding to the range of loads 1 in the positive direction
105 third increasing half-cycle corresponding to the range of loads 1 in the positive direction
401 first increasing half-cycle corresponding to the range of loads 4 in the positive direction
402 first decreasing half-cycle corresponding to the range of loads 4 in the positive direction

The invention claimed is:

1. A method for operating a component of a wind turbine by determining an equivalent mechanical load of the component, which component is subjected to a dynamic mechanical loading during operation, the method comprising:
   measuring a first measurement value of the mechanical load of the component during the operation of the component,
   operating at least one data processor for:
      comparing the first measurement value with a first reference value,
      first updating at least one count value representing the number of load half-cycles of the component based upon a result of the comparing,
         wherein the load half-cycles have a predetermined range of mechanical loads, which are measured within a time period prior to the measuring of the first measurement value,
      determining a first equivalent mechanical load of the component based upon a first updated count value,
      updating the first reference value to a second reference value based on the result of comparing the first measurement value with the first reference value,
   measuring a second measurement value of the mechanical load of the component during the operation of the component,
   operating the at least one data processor for:
      comparing the second measurement value with the second reference value,
      second updating the at least one count value representing the number of load half-cycles of the component based on the result of comparing the second measurement value with the second reference value, wherein the load half-cycles have a predetermined range of mechanical loads, which are measured within a time period prior to the measurement of the second measurement value,
      determining a second updated equivalent mechanical load of the component based on the second updated count value,
      further comparing the first measurement value with a further first reference value,
      further first updating at least one further count value representing the number of further load half-cycles of the component based on the result of further comparing, wherein the further load half-cycles have a further predetermined range of mechanical loads, which are measured within the time period prior to the measurement of the first measurement value and which comprise a lower bound being higher than a lower bound of the predetermined range of mechanical loads, and adapting the first updated count value,
      wherein determining the first equivalent mechanical load of the component is based on the adapted first updated count value and on the further first updated count value,
   triggering an indicative signal if the first updated equivalent load and/or the second updated equivalent load exceeds a preset threshold value, and
   adjusting operation of the component based on the triggered indicative signal.

2. The method as claimed in claim 1, wherein the first updating of the at least one count value comprises
   (a) increasing the at least one count value by one,
      when the first measurement value minus the first reference value is positive and falls within the predetermined range of mechanical loads or
   (b) leaving the at least one count value unchanged,
      when the first measurement value minus the first reference value is positive and does not fall within the predetermined range of mechanical loads or
      when the first measurement value minus the first reference value is negative.

3. The method as claimed in claim 2, wherein, in case the at least one count value has been increased by one in course of the first updating, the second updating of the at least one count value comprises
   (a) further increasing the at least one count value by one,
      when the second reference value minus the second measurement value is positive and falls within the predetermined range of mechanical loads or (b) leaving the at least one count value unchanged,
when the second reference value minus the second measurement value is positive and does not fall within the predetermined range of mechanical loads or
when the first reference value minus the first measurement value is negative.

4. The method as claimed in claim 2, wherein, in case the at least one count value has been left unchanged in course of the first updating, the second updating the at least one count value comprises
(a) increasing the at least one count value by one,
when the second measurement value minus the second reference value is positive and falls within the predetermined range of mechanical loads or
(b) further leaving the at least one count value unchanged,
when the second measurement value minus the second reference value is positive and does not fall within the predetermined range of mechanical loads or
when the second measurement value minus the second reference value is negative.

5. The method as claimed in claim 3, wherein updating the first reference value to the second reference value comprises
(a) setting the second reference value equal to the first measurement value,
when the first measurement value minus the first reference value is positive and falls within the predetermined range of mechanical loads or
when the first measurement value minus the first reference value is negative or
(b) setting the second reference value equal to the first reference value,
when the first measurement value minus the first reference value is positive and does not fall within the predetermined range of mechanical loads.

6. The method as claimed in claim 4, wherein updating the first reference value to the second reference value comprises
(a) setting the second reference value equal to the first measurement value,
when the first measurement value minus the first reference value is positive and falls within the predetermined range of mechanical loads or
when the first measurement value minus the first reference value is negative or
(b) setting the second reference value equal to the first reference value,
when the first measurement value minus the first reference value is positive and does not fall within the predetermined range of mechanical loads.

7. The method as claimed in claim 1, wherein the first updating of the at least one count value comprises
(a) increasing the at least one count value by one,
when the first reference value minus the first measurement value is positive and falls within the predetermined range of mechanical loads or
(b) leaving the at least one count value unchanged,
when the first reference value minus the first measurement value is positive and does not fall within the predetermined range of mechanical loads or
when the first reference value minus the first measurement value is negative.

8. The method as claimed in claim 1, wherein, in case the at least one count value has been increased by one in course of the first updating, the second updating of the at least one count value comprises
(a) further increasing the at least one count value by one,
when the second measurement value minus the second reference value is positive and falls within the predetermined range of mechanical loads or
(b) leaving the at least one count value unchanged,
when the second measurement value minus the second reference value is positive and does not fall within the predetermined range of mechanical loads or
when the second measurement value minus the second reference value is negative.

9. The method as claimed in claim 1, wherein in case the at least one count value has been left unchanged in course of the first updating, the second updating of the at least one count value comprises
(a) increasing the at least one count value by one,
when the second reference value minus the second measurement value is positive and falls within the predetermined range of mechanical loads or
(b) further leaving the at least one count value unchanged,
when the second reference value minus the second measurement value is positive and does not fall within the predetermined range of mechanical loads or
when the second measurement value minus the second reference value is negative.

10. The method as claimed in claim 8, wherein the updating of the first reference value to the second reference value comprises
(a) setting the second reference value equal to the first measurement value,
when the first reference value minus the first measurement value is positive and falls within the predetermined range of mechanical loads or
when the first reference value minus the first measurement value is negative or
(b) setting the second reference value equal to the first reference value,
when the first reference value minus the first measurement value is positive and does not fall within the predetermined range of mechanical loads.

11. The method as claimed in claim 1, further comprising:
adapting the first updated count value, including
decreasing the first updated count value by one, when the further first updating comprises increasing the at least one further count value and
leaving the first updated count value unchanged, when the further first updating comprises leaving the at least one further count value unchanged.

12. The method as claimed in claim 1, the method further comprising:
updating the further first reference value to a further second reference value based upon the result of further comparing the first measurement value with the further first reference value,
further comparing the second measurement value with the further second reference value,
further second updating the at least one further count value representing the number of further load half-cycles of the component based on the result of comparing the second measurement value with the further second reference value,
wherein the further load half-cycles correspond to the further predetermined range of mechanical loads and occur within a time period prior to the measurement of the second measurement value, and adapting the second updated count value, and determining the second updated equivalent mechanical load of the component based on the adapted second updated count value and the further second updated count value.

13. The method as claimed in claim 11, the method further comprising:

updating the further first reference value to a further second reference value based upon the result of further comparing the first measurement value with the further first reference value, further comparing the second measurement value with the further second reference value, further second updating the at least one further count value representing the number of further load half-cycles of the component based on the result of comparing the second measurement value with the further second reference value, wherein the further load half-cycles correspond to the further predetermined range of mechanical loads and occur within a time period prior to the measurement of the second measurement value, and adapting the second updated count value, and determining the second updated equivalent mechanical load of the component based on the adapted second updated count value and the further second updated count value.

14. The method as claimed in claim 1, further comprising:

adapting the second updated count value including decreasing the second updated count value by one, when the further second updating comprised increasing the at least one further count value and leaving the second updated count value unchanged, when the further second updating comprised leaving the at least one further count value unchanged.

15. The method according to claim 1, wherein the adjusting of the operation comprises stopping operation of the component.

16. The method according to claim 1, further comprising replacing the component.

17. The method according to claim 1, wherein the first measurement value and the second measurement value are determined via one or more load sensors.

* * * * *